(12) United States Patent
Chin et al.

(10) Patent No.: US 7,191,393 B1
(45) Date of Patent: Mar. 13, 2007

(54) INTERFACE FOR PROVIDING DIFFERENT-LANGUAGE VERSIONS OF MARKUP-LANGUAGE RESOURCES

(75) Inventors: Pi-Wei Chin, San Jose, CA (US); Daniel Graham Douglas, San Jose, CA (US); Edward Joseph Gallagher, San Jose, CA (US); Benjamin Franklin Yee, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 09/161,073

(22) Filed: Sep. 25, 1998

(51) Int. Cl.
*G06F 15/00* (2006.01)
*G06F 17/00* (2006.01)
*G06F 15/16* (2006.01)

(52) U.S. Cl. .................. 715/513; 715/501.1; 715/536; 704/4; 709/217

(58) Field of Classification Search ................ 707/513, 707/10, 536; 704/3, 8, 2, 4; 709/217, 218; 715/536, 513, 501.1
See application file for complete search history.

(56) References Cited

U.S. PATENT DOCUMENTS

| | | | | |
|---|---|---|---|---|
| 5,644,774 | A * | 7/1997 | Fukumochi et al. | 704/4 |
| 5,659,765 | A * | 8/1997 | Nii | 704/4 |
| 5,710,918 | A | 1/1998 | Lagarde et al. | 707/10 |
| 5,944,790 | A * | 8/1999 | Levy | 709/218 |
| 6,119,078 | A * | 9/2000 | Kobayakawa et al. | 704/3 |
| 6,208,956 | B1 * | 3/2001 | Motoyama | 704/2 |
| 6,212,537 | B1 * | 4/2001 | Nosohara | 707/536 |
| 6,623,529 | B1 * | 9/2003 | Lakritz | 715/536 |

FOREIGN PATENT DOCUMENTS

| | | |
|---|---|---|
| GB | 2315140 | 1/1998 |
| JP | 09106399 | 4/1997 |
| JP | 09259126 | 10/1997 |
| JP | 09265469 | 10/1997 |
| JP | 09325961 | 12/1997 |
| JP | 10-247183 | 9/1998 |
| JP | 10-254783 | 9/1998 |

(Continued)

OTHER PUBLICATIONS

Cliff Berg, How do I Write an International Application?, Dr. Dobb's Journal, Jul. 1997, downloaded web site <url: http://www.ddj.com/articles/1997/9707/97071/97071.htm?topic=java>, pp. 1-9.*

(Continued)

*Primary Examiner*—William Bashore
(74) *Attorney, Agent, or Firm*—Raymond E. Roberts; Intellectual Property Law Offices

(57) ABSTRACT

A user interface construction method (10) for a web based user interface ("WUI") 18. A server 12 has an HTML template 22, HTML ResourceBundles 24, and JAR files 26 containing Java ResourceBundles 28. At run-time, a user will select a language at the browser 24 and a language code 44 will be transmitted to the server 12, whereupon the server 12 will construct a constructed HTML code 46 from the HTML template 22 and a corresponding HTML Resource-Bundle 24. The constructed HTML code 46 (including Java code 25 inserts) will then be transmitted to the browser 14 along with the JAR file containing the Java Resource-Bundles 28.

5 Claims, 3 Drawing Sheets

FOREIGN PATENT DOCUMENTS

| WO | WO97/18516 | 5/1997 |
| WO | WO97/19415 | 5/1997 |

OTHER PUBLICATIONS

Maeda, Akira et al., a Multilingual Browser for WWW without Preloaded Fonts, web site <http://eboshi.ulis.ac.jp/papers/isdl95/isdl95.html>, Aug. 11, 1996, pp. 1-4.*

Microsoft Press Computer Dictionary, 3rd Edition, 1997 Microsoft Corporation, p. 463.*

Seltzer, Richard, Making the Web Truly Global, Web page (last revised Jan. 20, 1998), downloaded from url: <http://www.glreach.com/eng/ed/art/autotranslate.html>, on May 16, 2002, pp. 1-6.*

1998 IEEE Network Operations and Management Symposium, vol. 1, Feb. 15-20, New Orleans, LA, USA pp. 110-119.

* cited by examiner

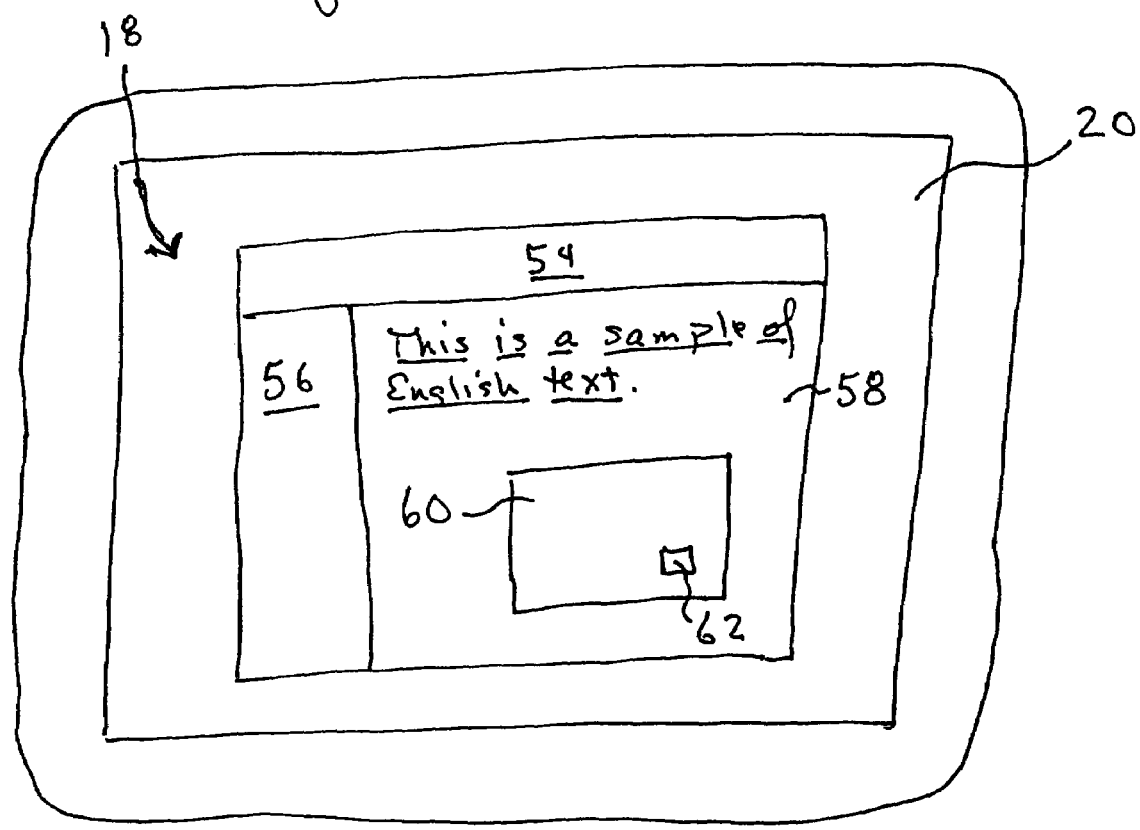

INTERFACE FOR PROVIDING DIFFERENT-LANGUAGE VERSIONS OF MARKUP-LANGUAGE RESOURCES

COPYRIGHT NOTICE

A portion of the disclosure of the patent document contains material which is subject to copyright protection. The owner, International Business Machines Corporation, has no objection to the facsimile reproduction by anyone of the patent disclosure, as it appears in the Patent and Trademark Office patent files of records of any country, but otherwise reserves all rights whatsoever.

TECHNICAL FIELD

The present invention relates to the field of computer data communications and more specifically to a method and system for providing World Wide Web user interface pages which are adapted for particular audiences. The predominant current usage of the present inventive web based user interface ("WUI") construction method is in providing web pages for the World Wide Web, wherein the ability to provide particular languages, dialects, currencies, and the like, all adapted for a particular audience, is desired.

BACKGROUND ART

Internationalization is the process of enabling a program to run internationally. That is, an internationalized program has the flexibility to run correctly in any country. Once a program has been internationalized, enabling it to run in a particular country and/or language is merely a matter of "localizing" it for that country and language, or locale.

One task in the process of internationalization is the translating of a program's user-visible interface into a local language. However, this is by no means the only operation required. Other concerns include displaying dates and times in the customary format for the locale, displaying number and currency values in the customary format for the locale, and sorting strings in the customary order for the locale.

Underlying all these localization issues is the even more fundamental issue of character encoding. Almost every useful program must perform input and output of text and, therefore, it is necessary to be able to adapt to local characterization standards.

Web-based user interfaces (hereinafter referred to as "WUI") are often implemented in both HTML and JAVA. Each display consists of one or more components (i.e. HTML page/frame(s) and/or JAVA applet panel(s)). Translation in a WUI is complicated by the fact that these components are built at different times (i.e. HTML pages/frames are built by an application running on the web server prior to down-loading, while applet panels are constructed by Java code as it executes in memory on the end user's local machine.)

In summary, in order to be adaptable for distribution to international markets, a web page must be flexible enough to display messages (or any other type of user-visible text, such as labels on GUI buttons) to the user in an appropriate language and format for the current locale. Typically, this means that the program should not use hard-coded messages and must instead read in a set of messages at run time, based on the local setting. Java provides a way to do this for Java applets. In Java, messages are defined as key/value pairs in a "ResourceBundle" subclass. Then, a subclass of ResourceBundle is created for each language or locale that the application is intended to support, naming each class following a convention that includes the local name. At runtime, a ResourceBundle.getBundle( ) method is used to load the appropriate ResourceBundle class for the current locale. The ResourceBundle contains the messages which the application uses, each associated with a key which serves as the message name. Using this technique, the application can look up a locale dependent message translation based on a locale independent message name.

The above brief description of the problems associated with internationalization discloses that Java has provided some solutions for use within Java applets. However, to the inventor's knowledge, no corresponding solution exists for the HTML ("hyper-text markup language) encoded portions of an interface, which constitute the great majority of the most such user interfaces. To date, it has been required to provide a different HTML code for each language or variation of a user interface for which a target audience is desired.

DISCLOSURE OF INVENTION

Accordingly, it is an object of the present invention to provide a web based user interface which is readily adaptable to varying languages and/or target audiences.

It is still another object of the present invention to provide a web based user interface which will require only limited bandwidth to attain acceptable transfer speed.

It is yet another object of the present invention to provide a web based user interface which will not require modifications to browser software to obtain a multi-language capability.

It is still another object of the present invention to provide a method for creating a web based user interface which will provide an output adapted for a particular language and/or target audience.

Briefly, the preferred embodiment of the present invention is a system for storing and communicating data which extends the internationalization capabilities built into the Java language, and further greatly improves the internationalization of web based user interfaces by providing key variables and corresponding values. The values are provided or created in the server in a plurality of HTML ResourceBundle classes (similar to the known Java ResourceBundle classes in structure, but differing in content as will be described in more detail hereinafter) such that there is an HTML ResourceBundle for each language or other such variable in which it is desired to communicate the user interface.

When a browser has requested a user interface page and provided information to the server regarding the language desired, the server builds the HTML code to send using the HTML code with embedded keys and the values from the appropriate HTML ResourceBundle. Java applets within the HTML encoded interface are also sent, along with a JAR file containing Java ResourceBundle(s) for each potential language. At the browser, the applets are constructed using the appropriate Java ResourceBundle from the JAR file.

An advantage of the present invention is that it is easier to internationalize web based user interfaces.

A further advantage of the present invention is that internationalized web pages are more compactly stored on a server.

Yet another advantage of the present invention is that web pages can be internationalized without increasing the amount of data which must be transmitted to a browser.

These and other objects and advantages of the present invention will become clear to those skilled in the art in view of the description of the best presently known mode of carrying out the invention and the industrial applicability of the preferred embodiment as described herein and as illustrated in the several figures of the drawing.

BRIEF DESCRIPTION OF THE DRAWINGS

FIG. 3 is a graphical representation of a typical web based user interface.

BEST MODE FOR CARRYING OUT INVENTION

Figure 1:
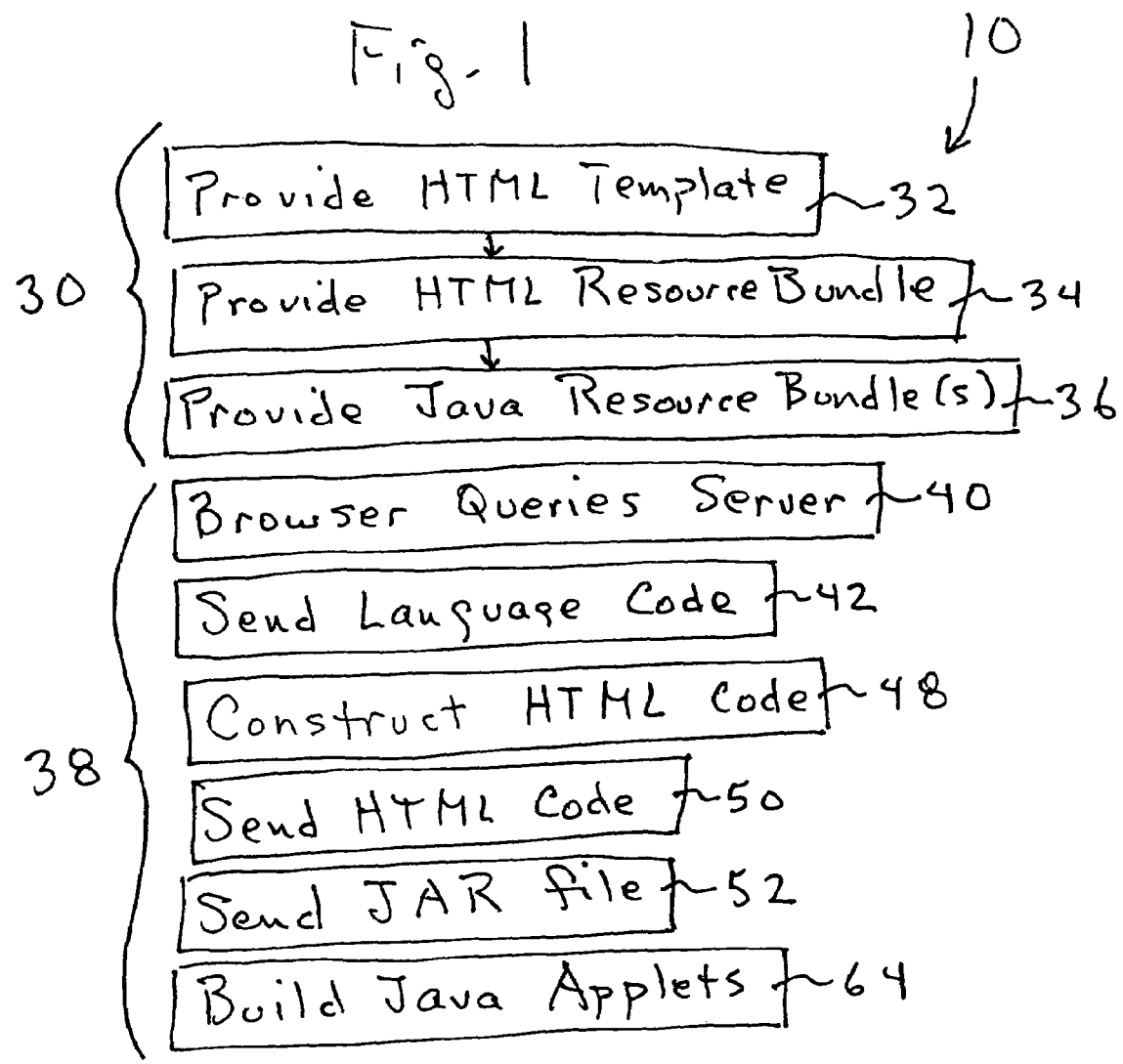
FIG. 1 is a flow diagram showing an example of the inventive web based user interface construction method.

The best presently known mode for carrying out the invention is a user interface construction method which includes the capabilities required for internationalization. The inventive user interface construction method is depicted in a flow diagram in FIG. 1 and is designated therein by the general reference character 10.

Figure 2:
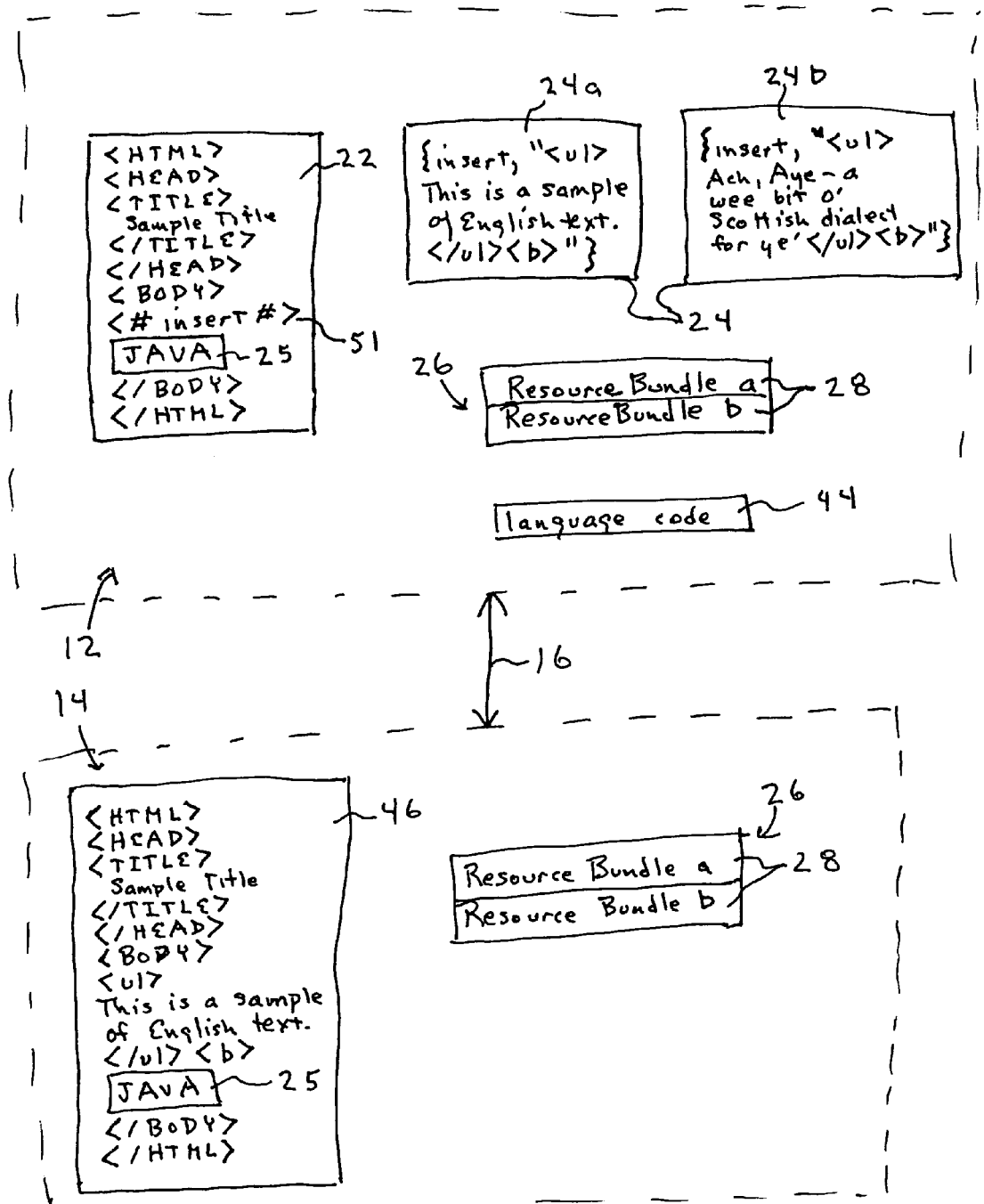
FIG. 2 is a block diagram showing relevant portions of the content of a server and browser connected over the internet.

FIG. 2 is a block diagram showing relevant portions of the content of a server 12 and browser 14 connected over the internet 16, and FIG. 3 is a graphical representation of a typical web based user interface 18 such as will be displayed by the browser 14. It should be noted that, herein, the server 12 indicates a combination of a computer and software running thereon, and the browser 14 likewise indicates a combination of a computer and software running thereon. The web based user interface 18 of FIG. 3 will typically be displayed on a display screen 20 associated with the browser (FIG. 2).

In the view of FIG. 2, it can be seen that, according to the present invention, the server has an HTML template 22 and a plurality (in this example, only two are shown for the sake of simplicity) of HTML ResourceBundles 24 (designated as 24a and 24b, herein). As will be discussed in more detail hereinafter, the term "HTML ResourceBundle" will be defined herein as being a file or files having the content according the present invention as described herein. It should be noted that, in the example presented herein, the file structure of the HTML ResourceBundles 24 is not different from that of conventional Java ResourceBundles, and so in this example the difference between the HTML ResourceBundles 24 and conventional Java ResourceBundles is in content only. However, it is within the scope of the invention that different file structures could be adapted for containing the information discussed herein as being included within the HTML ResourceBundles 24.

Typically, within the HTML template will be one or more (only one is shown in this example) of Java code 25 segments. In order to avoid unduly complicating the drawing of FIG. 2, the Java code 25 is represented therein in block diagrammatic form by the word "JAVA" enclosed in a block within the HTML code.

A JAR file 26 is a well known type of file construction which is associated with Java applications. The JAR file 26 is a compressed file which, according to the present invention will contain a plurality (two, in the present example) of Java ResourceBundles.

Accordingly, referring again to the flow chart of FIG. 1 in conjunction with FIG. 2, according to the inventive user interface construction method 10, in a series of preliminary operations 30 (prior to communication between the server 12 and the browser 14) the HTML template 22 is stored in the server 12 in a provide HTML template operation 32. Similarly, The HTML ResourceBundles 24 are stored in the server 12 in a provide HTML ResourceBundles operation 34, and the JAR file 28 containing the Java ResourceBundles 28 is stored (or created) in the server 12 in a provide Java ResourceBundles operation 36.

Now turning to a discussion of run-time operations 38 as depicted in the flow chart of FIG. 1, at run-time the browser 14 will query the server 12 over the internet 16 in the conventional manner. This is indicated by a browser queries server operation 40 in the flow chart of FIG. 1. In a send language code operation 42 a language code 44 (depicted in box diagrammatic form in the example of FIG. 2) is sent from the browser 14 to the server 12. While some browsers have the capability of automatically sending the language code 44 when querying the server 12, it is within the scope of the invention that additional steps might be included such that the server 12 could request more information from the browser 14, perhaps even including user input at the browser 14, which would generate the language code 44 to be sent to the server 12. For example, where there might be other alternatives involved besides language—such as longer or shorter versions of the textual descriptions to be displayed in the user interface 18—it is within the scope of the invention that a selected language code 44 be sent from the browser 14 to the server 12 to accommodate such a choice by the selection of a particular HTML ResourceBundle 24. Typically, however, on a sign on page there will be a choice box to indicate what language is wanted. For the purpose of this example and the corresponding illustrations, we will hereinafter assume that a user selects the HTML ResourceBundle 24a, which will contain text in US English format.

Continuing with the run-time operations 38, the server 12 will then construct and send a constructed HTML code 46 to the browser 14, using the selected HTML ResourceBundle 24, in operations respectively designated in FIG. 1 as a construct HTML code operation 48 and a send HTML code operation 50. The appropriate JAR file 26 is likewise sent from the server 12 to the browser 14 in a send JAR file operation 52. It should be noted that, although the inventors have found it presently most economical to send the entire JAR file 26 containing all of the Java ResourceBundles 28 corresponding to a particular page of the WUI, it is within the scope of the invention that only selected Java ResourceBundles 28 be sent, as determined by the language code 44.

In the construct HTML code operation 48, a replacement variable 51 within the HTML template 22 is replaced with the corresponding content of the selected HTML ResourceBundle 24. The replacement variable 51 is set within HTML command delineators ("<" and ">") and is identified by being further set within pound signs ("#"). Within the selected HTML ResourceBundle 24, the appropriate corresponding text is identified as follows: Data members within the ResourceBundle 24 are separated and identified by being set within curly brackets ("{" and "}"), within the curly brackets, the key replacement variable 51 corresponds to that as within the HTML template 22. Following the key replacement variable 51 is a comma (",") and the comma is followed by the text or other item which is to replace the replacement variable. It should be noted that the replacement content of the HTML ResourceBundle can include text, HTML instructions, drawing files, or any other content which will be recognized by the browser 14 as HTML content in order to construction the WUI.

Referring now again to FIG. 3, the example of the typical web based user interface shown has a title frame 54, a navigation frame 56 and a work frame 58. Within any of these, but particularly in the work frame 58 might optionally be one or more (one is shown in the example of FIG. 3) of Java applet(s) 60, and the Java applet(s) will often contain one or more (one is shown in the example of FIG. 3) of buttons 62, or such like features as are know to those skilled in the art to be included in Java applet(s) 60. The Java applet 60 is constructed by the browser 14 machine at run time using the appropriate Java ResourceBundle 28 from the JAR file 26 as dictated by the language of choice of the browser 14. This operation is indicated in the flow diagram of FIG. 1 by a build Java applets operation 62. In the conventional manner, the Java applet 60 can react dynamically with the user within the browser 14 such that communication between the server 12 and the browser 14 is minimized.

One skilled in the art will recognize that the example coding depicted in FIG. 2 will produce, according to the present invention, the work frame 58 of FIG. 3.

It should be remembered that the example being illustrated is for a single "page" of a user interface. It is contemplated by the inventors that the present invention might include many iterations of the HTML template 22 and related aspects to provide for the availability of a plurality of different pages of the web based user interface 18. Similarly, it should be remembered that, although the simple example described herein has only two of the HTML Resource-Bundles 24, in most applications there will be a greater plurality of HTML ResourceBundles and a matching plurality of the Java ResourceBundles 28, to accommodate a greater plurality of language choices, or other such alternative presentations as may be desired.

INDUSTRIAL APPLICABILITY

The inventive user interface construction method 10 is intended to be widely used for producing web based user interfaces which are readily adaptable for presentation in a variety of languages, or in any other alternative formats as may be desired.

It is anticipated that, as the present inventive method becomes popular, web page construction engines will be adapted to automatically insert keys and to construct associated HTML ResourceBundles.

As previously stated herein, both the server 12 and the browser 14 will generally be embodied as computers connected to the internet 16. The HTML Template 22, the HTML ResourceBundles 24, and the Java ResourceBundles 26 may each be embodied in essentially any computer readable medium such the operations 32, 34 and 36 of the flow diagram of FIG. 1 may each and all be accomplished by transferring the respective data from the computer readable medium to the server 12 computer. Similarly, the operations described herein in relation to the flow diagram of FIG. 1 may be physically embodied in computer readable program code which may also be stored on a computer readable medium and transferred therefrom to the server 12 or any such computer.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

Since the user interface construction method 10 of the present invention may be readily produced and integrated into existing web servers and web based user interface construction systems and devices, and since the advantages as described herein are provided, it is expected that it will be readily accepted in the industry. For these and other reasons, it is expected that the utility and industrial applicability of the invention will be both significant in scope and long lasting in duration.

The invention claimed is:

1. A computer implemented user interface, comprising:
a markup-language encoded template having a replacement variable within; and
a plurality of resource files containing data for replacing said replacement variable, said replacement variable being selectively replaced by data from a selected one of said resource files, each of the plurality of said resource files containing an idiomatically-correct predefined passage of text in a different language such that said replacement variable will always be replaced with a respective said passage of text governed by the selection of a particular one of said resource files; wherein
said particular one of said resource files is selected according to a language code.

2. A computer implemented user interface, comprising:
a markup-language encoded template having a replacement variable within; and
a plurality of resource files containing data for replacing said replacement variable, said replacement variable being selectively replaced by data from a selected one of said resource files, each of the plurality of said resource files containing an idiomatically-correct predefined passage of text in a different language such that said replacement variable will always be replaced with a respective said passage of text governed by the selection of a particular one of said resource files; wherein
a constructed markup-language code is built at a server by combining said markup-language encoded template and data from said resource file.

3. The user interface of claim 2, wherein:
the server builds the constructed markup-language code by substituting said replacement variable with data from said resource file.

4. A method for constructing a web based user interface, comprising:
providing an HTML template to a server, said HTML template including at least one variable;
providing a plurality of data files to the server, each of said data files having therein a different language data portion corresponding to said variable, the data portion comprising idiomatically-correct predefined content;
selecting one of said plurality of data files; and
constructing an HTML encoded user interface file by always substituting the same data portion from the selected one of said plurality of data files into said HTML template to replace said variable; wherein
a language code is sent from a browser to the server; and
the one of said plurality of data files is selected according to the language code.

5. The method of claim 4, wherein:
the language code is selected to indicate a particular language such that the one of said plurality of data files is selected according to the language desired.

* * * * *